Inventor:
Harold F. Silver.

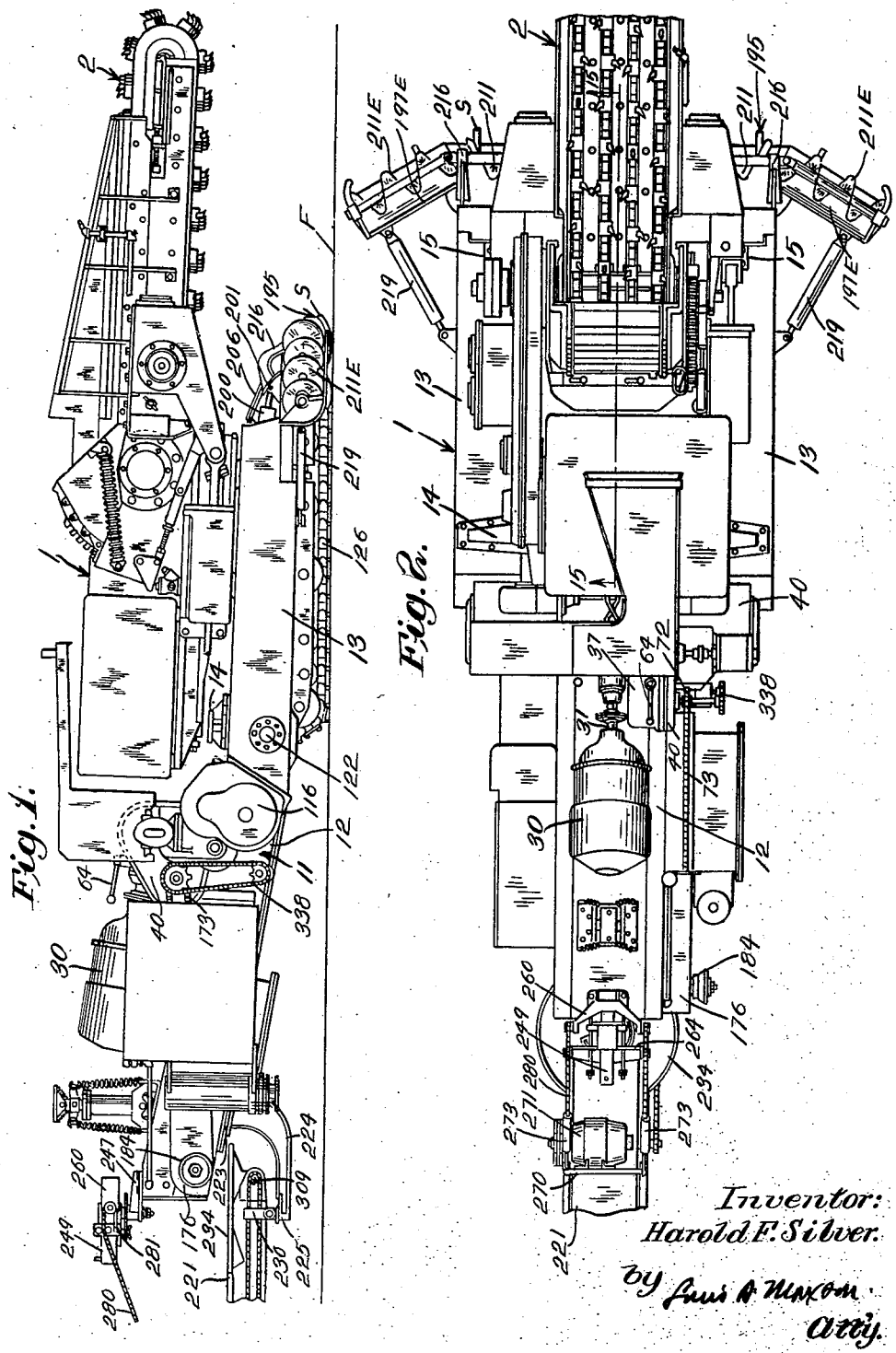

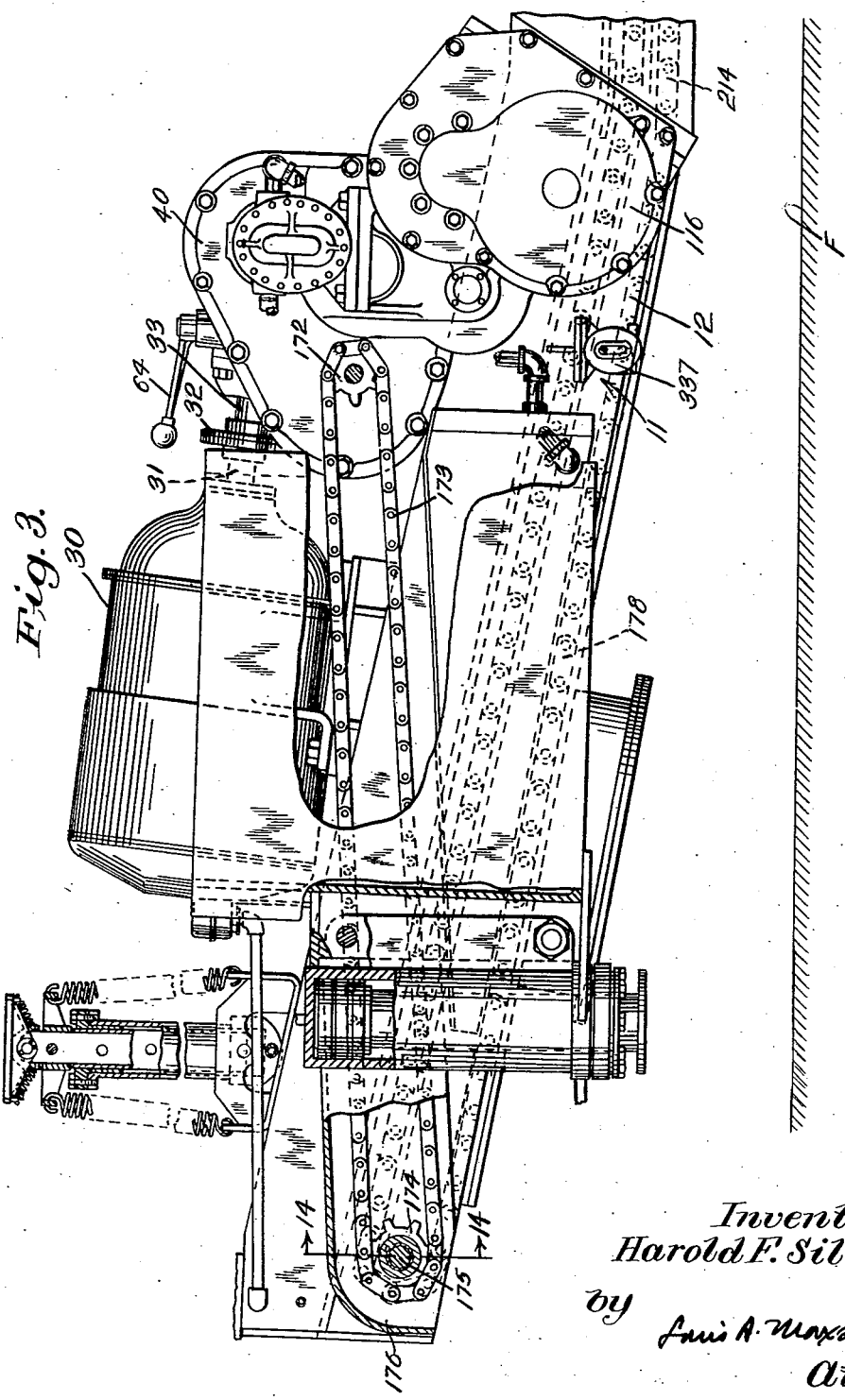

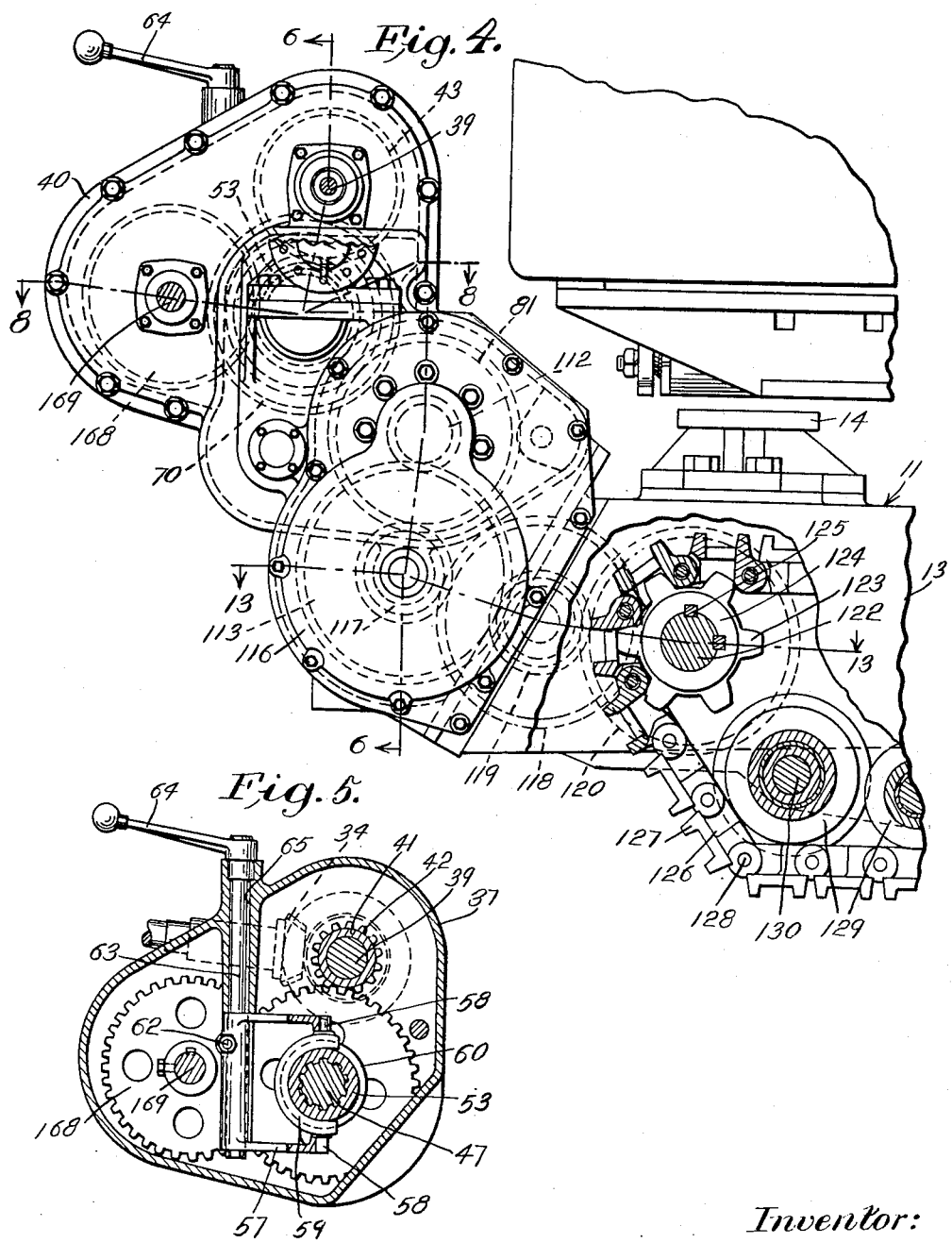

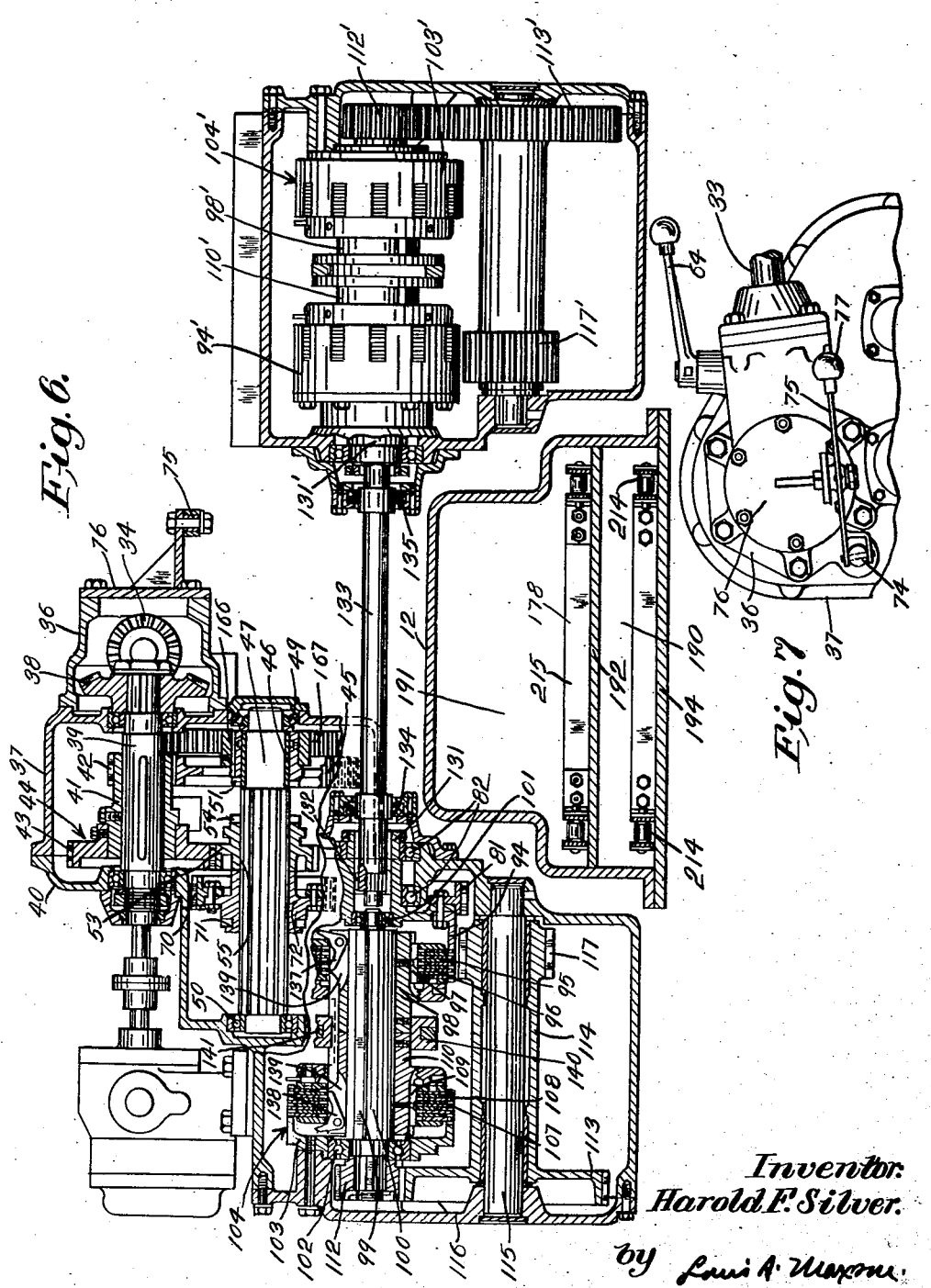

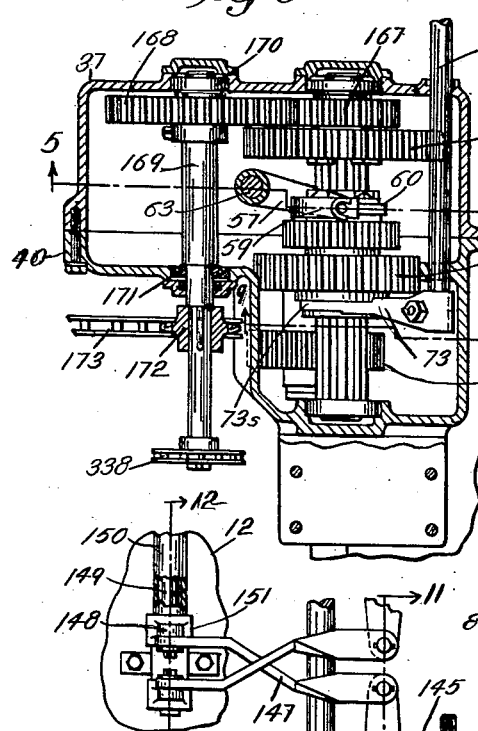

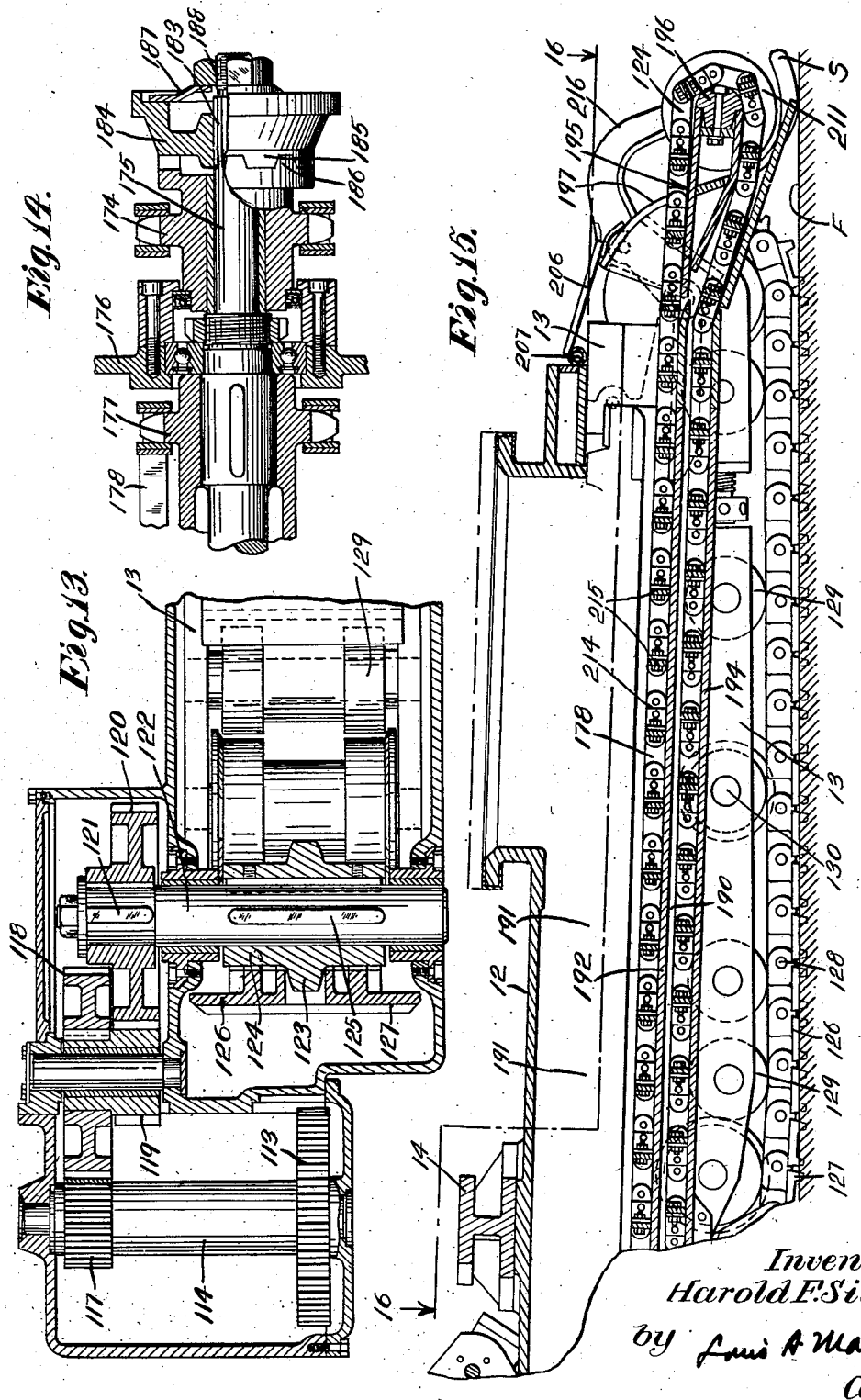

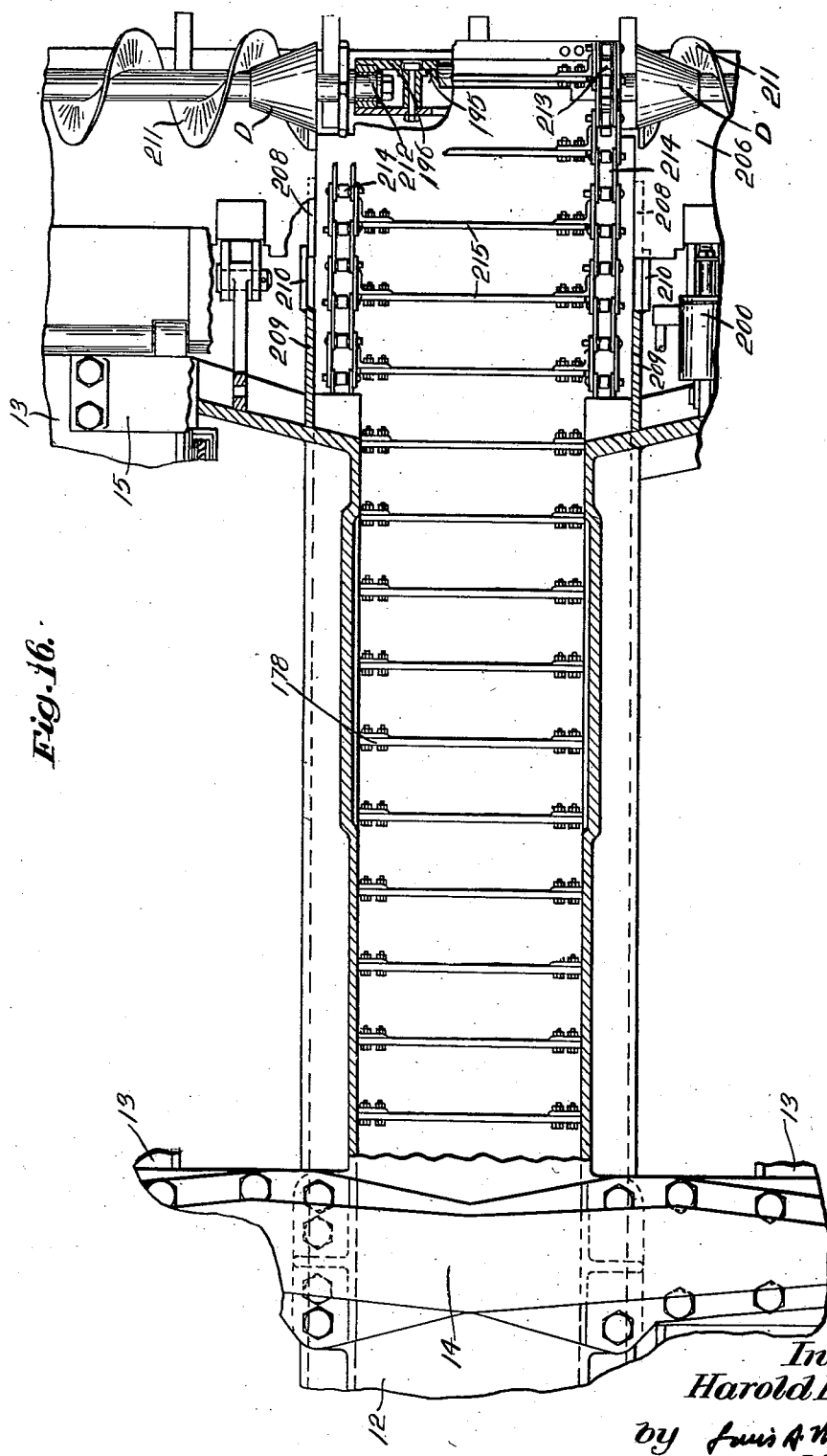

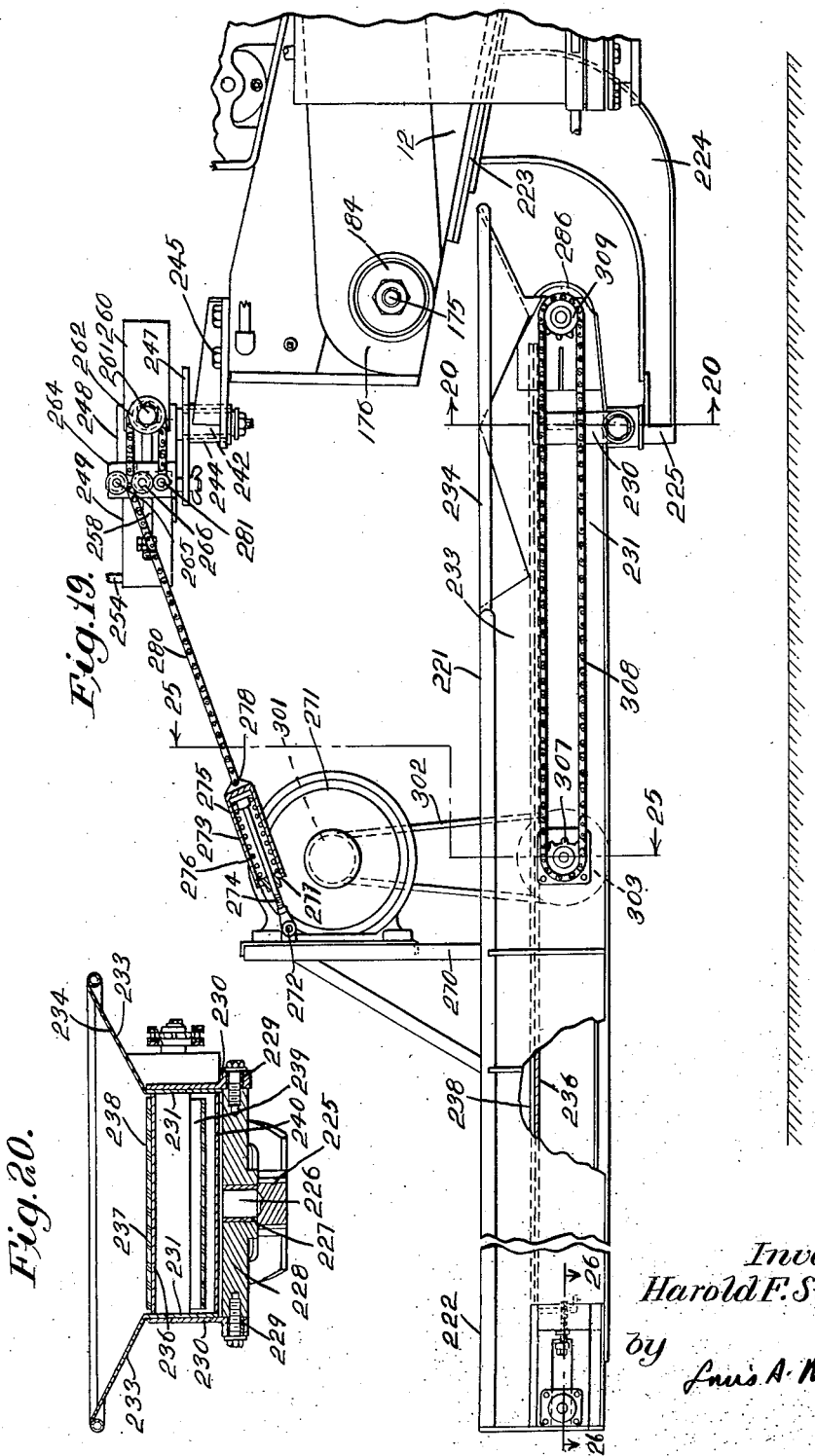

Oct. 8, 1957 H. F. SILVER 2,808,920
MATERIAL LOADING APPARATUS
Original Filed Feb. 27, 1948 12 Sheets-Sheet 10
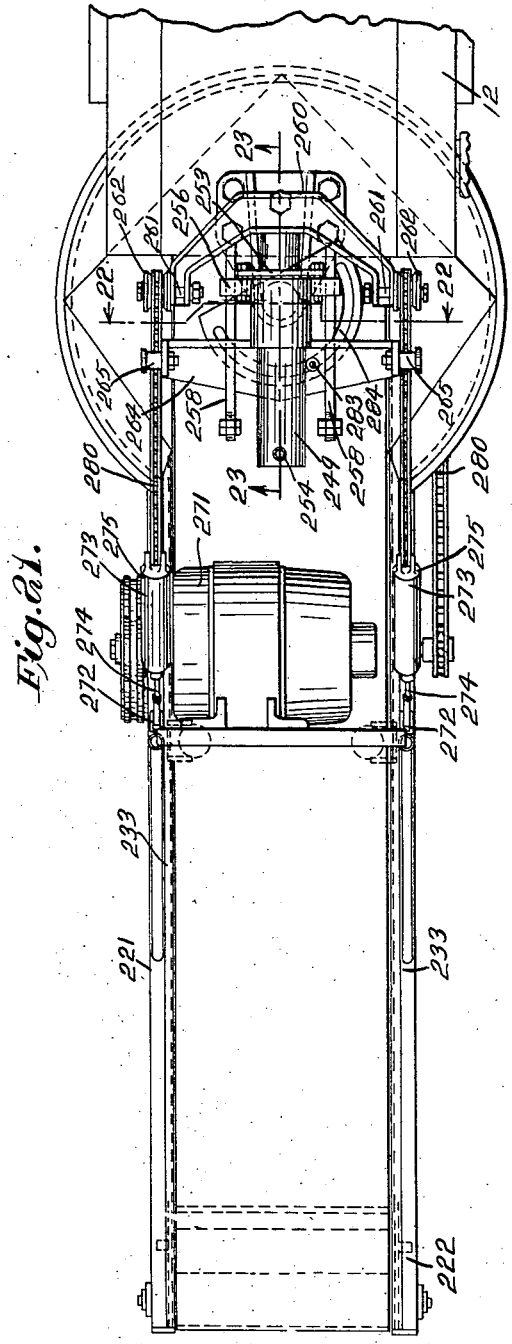
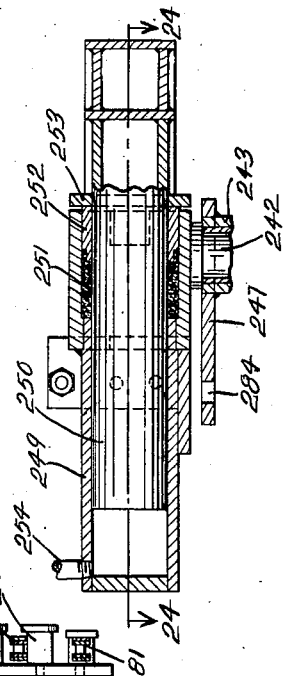
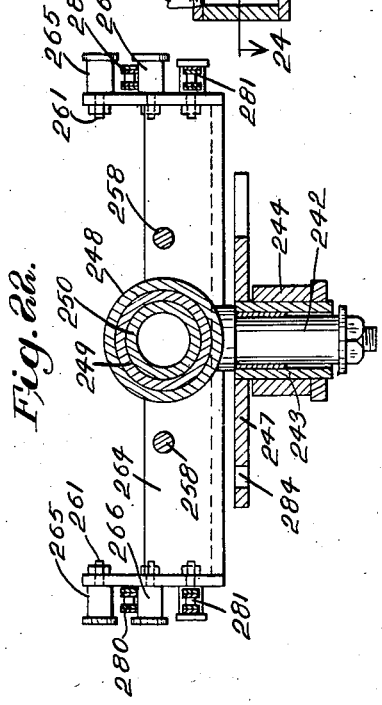
Inventor:
Harold F. Silver.
by Fred A. Maxom.
atty.

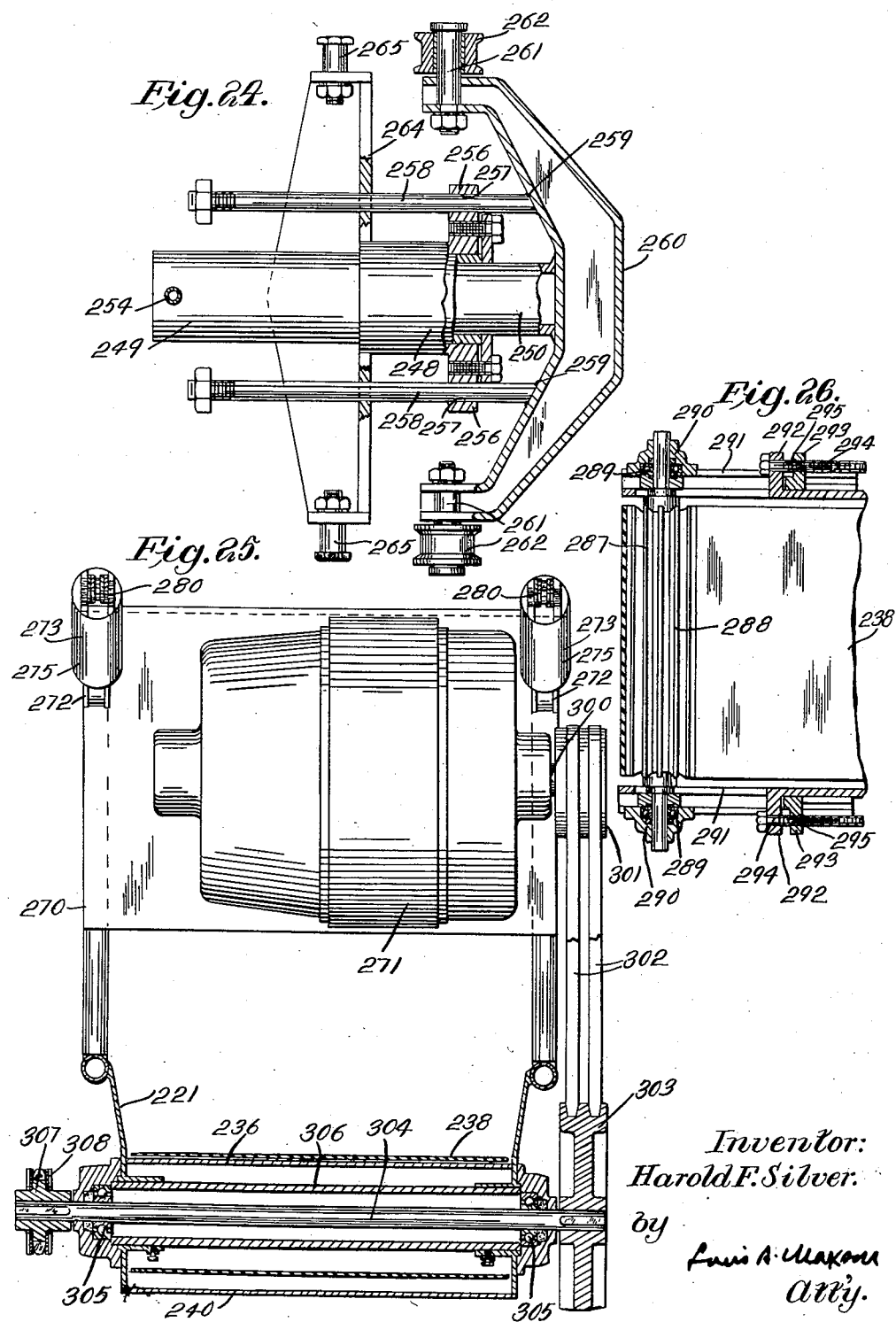

Oct. 8, 1957  H. F. SILVER  2,808,920
MATERIAL LOADING APPARATUS
Original Filed Feb. 27, 1948  12 Sheets-Sheet 12
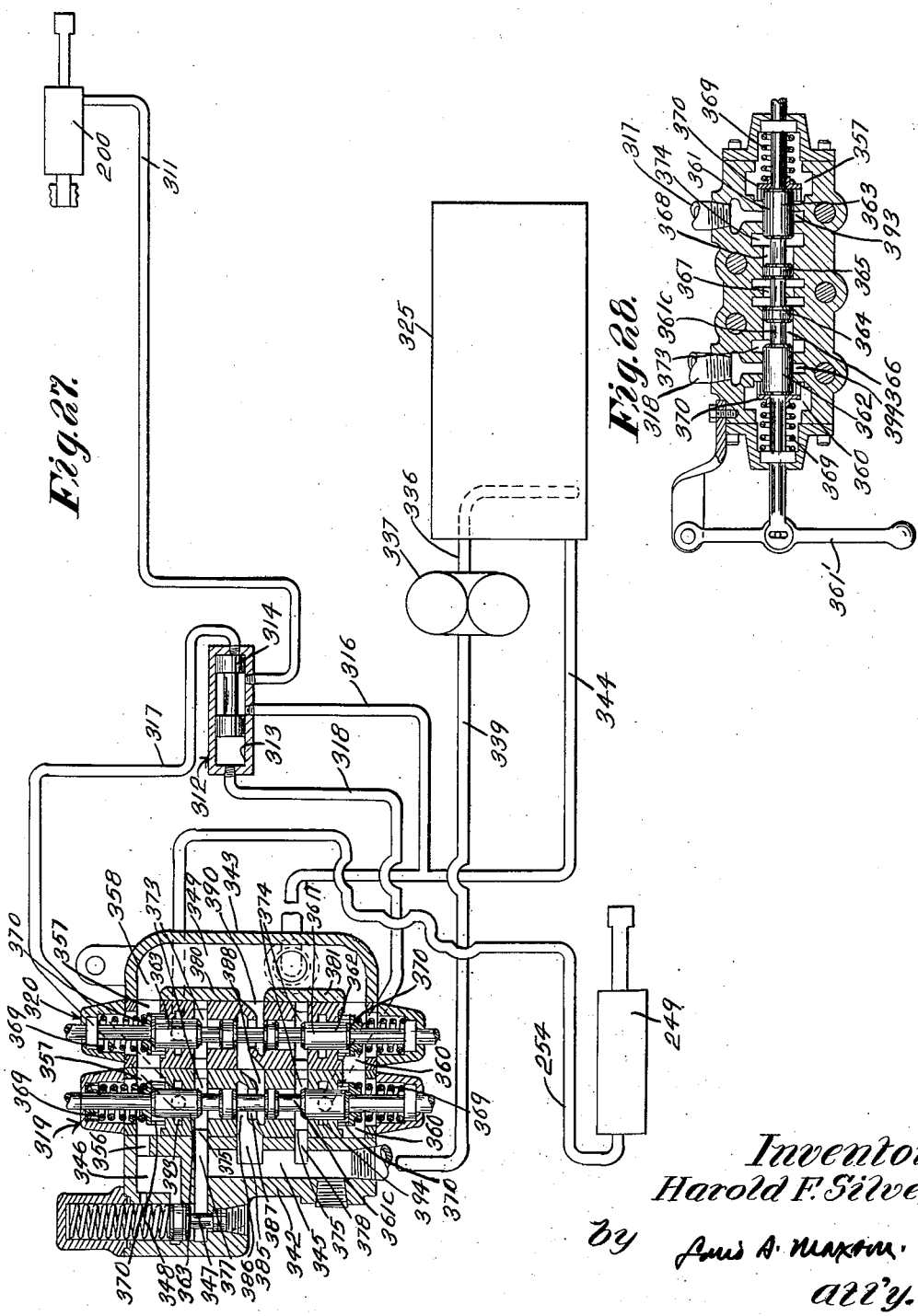
Inventor:
Harold F. Silver.
By Ames A. Maxam.
att'y.

United States Patent Office 2,808,920
Patented Oct. 8, 1957

2,808,920

MATERIAL LOADING APPARATUS

Harold F. Silver, Denver, Colo., assignor to Joy Manufacturing Company, a corporation of Pennsylvania Original application February 27, 1948, Serial No. 11,688, now Patent No. 2,798,711, dated July 9, 1957. Divided and this application April 17, 1951, Serial No. 221,475

8 Claims. (Cl. 198—9)

My invention relates to loading apparatus, and more particularly to apparatus for loading material from a subjacent surface and delivering it to a point to the rear of the apparatus. It further relates to loading apparatus of the mobile type having improved means for cleaning up material from the paths of its propulsion mechanism and adapted, in a preferred embodiment, to follow, and to clear the bottom close to, mine ribs, without danger of breakage of its mechanism. Others of its aspects will subsequently be noted.

This application is a division of my application, Serial No. 11,688, filed February 27, 1948, now Patent No. 2,798,711, which application was a continuation-in-part of application Serial No. 750,981, filed May 28, 1947, and now abandoned.

An object of the present invention is to provide an improved loading apparatus. Another object is to provide such an apparatus incorporating improved means for delivering the material which it gathers, to a material handling system, and also including improved means for picking up and effecting delivery to such material handling system, of material from a mine floor or the like. Still another object is to provide. an improved pick-up and loading mechanism for clearing up the mine floor in advance of a loading apparatus, whereby the propulsion and maneuvering thereof may be facilitated. A further object is to provide improved apparatus for loading near a mine rib or the like. Other objects of the invention will hereinafter appear.

In the accompanying drawings, in which the invention is shown, for purposes of illustration, incorporated as a part of a continuous mining apparatus of the character disclosed in the applications hereinabove referred to, Fig. 1 is a side elevational view of a continuous mining apparatus in which the present invention in loading apparatus is incorporated, with a portion of a tail conveyor, which may be used with it and form a part of it under some circumstances, shown in operative position.

Fig. 2 is a plan view of the apparatus shown in Fig. 1.

Fig. 3 is an enlarged side elevational view of the rear end of the primary apparatus, with parts broken away to show details, and other parts omitted.

Fig. 4 is an enlarged side elevational, fragmentary view, with parts broken away to show a portion of the drive for the crawlers or tractor treads.

Fig. 5 is a detail sectional view taken on the plane of the line 5—5 of Fig. 8.

Fig. 6 is a transverse, generally vertical section on the planes of the line 6—6 of Fig. 4, showing the multispeed driving and braking arrangement for the crawlers or tractor treads, etc.

Fig. 7 is a fragmentary elevational view showing the control for the selective fast and slow speed drive for the crawlers or tractor treads.

Fig. 8 is a generally horizontal section on the planes of the line 8—8 of Fig. 4.

Fig. 9 is a vertical, longitudinal section on the plane of the line 9—9 of Fig. 8.

Fig. 10 is a horizontal section on the plane of the line 10—10 of Fig. 9.

Fig. 11 is a fragmentary vertical section on the plane of the line 11—11 of Fig. 10.

Fig. 12 is a fragmentary vertical sectional view on the plane of the section line 12—12 of Fig. 10.

Fig. 13 is a generally horizontal sectional view on the plane of the section line 13—13 of Fig. 4, showing details of the drive for a crawler or tractor tread.

Fig. 14 is an enlarged fragmentary transverse sectional view on the plane of the line 14—14 of Fig. 3, showing a safety clutch in the main conveyor drive.

Fig. 15 is an enlarged vertical sectional view taken on the plane of the section line 15—15 of Fig. 2 and with parts omitted, this view showing principal parts of the primary apparatus forward of the structure illustrated in Fig. 3.

Fig. 16 is a fragmentary horizontal sectional view taken on the plane of the line 16—16 of Fig. 15, with some parts shown in full.

Fig. 19 is a side elevational view, on an enlarged scale, of a tail conveyor which may be used under certain conditions as an adjunct to or a part of my loading apparatus.

Fig. 20 is a transverse sectional view on the line 20—20 of Fig. 19, showing a portion of the suspension means for the tail conveyor.

Fig. 21 is a plan view of the tail conveyor, with parts omitted.

Fig. 22 is an enlarged transverse vertical section on the planes of the line 22—22 of Fig. 21.

Fig. 23 is an enlarged vertical section on the plane of the line 23—23 of Fig. 21.

Fig. 24 is a horizontal section on the plane of the line 24—24 of Fig. 23.

Fig. 25 is an enlarged vertical section on the plane of the line 25—25 of Fig. 19, showing the motor and the driving devices operated thereby for the tail conveyor.

Fig. 26 is a detail, horizontal section on the plane of the line 26—26 of Fig. 19, showing the takeup for the tail conveyor.

Fig. 27 is a diagrammatic view showing a hydraulic control system.

Fig. 28 is a central section through a control valve unit.

Figure 17:
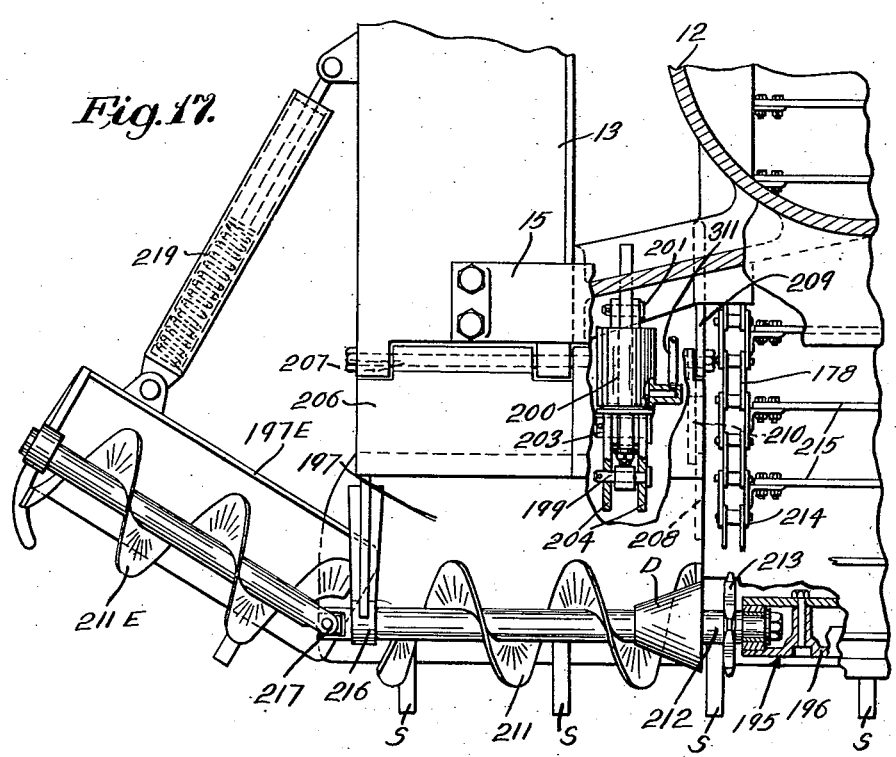
Fig. 17 is a fragmentary plan view, with parts shown in horizontal section, showing details of the side scroll construction.

Referring to the drawings, it will be noted that the improved loading apparatus of this application is shown in Figs. 1 and 2 as incorporated in a continuous mining apparatus 1 of the type shown in the parent application above mentioned, wherein it forms a part of an improved combination different from the combinations of this present application, in which there is disclosed and claimed improved loading apparatus of general utility. So far as the present application is concerned, the material disintegrating apparatus of the parent case, shown at 2 in Figs. 1 and 2, forms no part of the invention to be claimed; and the entire disintegrating apparatus and the means for delivering from it, to the conveyor, herein described, disintegrated material may be considered as omitted, and as being replaced, as indicated in construction lines in Fig. 15, by any suitable closure member for the opening to the conveyor passageway which their removal would have uncovered.

The loading apparatus of this invention is generally designated 11, and is of the self-propelled type, and includes an elongated body 12 supported between crawler or tractor-tread frames 13, for movement over a surface F, from which material is to be picked up and delivered to a desired place.

The elongated body 12 is supported near the rear end of a tractor mounting later described, by a transverse support member 14, which is bolted to the top of the body 12 and bolted at its ends to the tractor-tread frames 13 hereinafter described, and at the forward end of the body there are laterally extending feet or foot members 15 which also rest upon the tractor frames, and which have angularly related portions which engage and which are secured to the mutually adjacent sides of the tractor frames.

Herein there is disclosed an arrangement in which power for both transport and loading is shown as derived from a common source, but it is obvious that such an arrangement is not essential. The common power source is shown as a motor 30 mounted on a support carried on the body 12 in any suitable manner.

The motor 30 has a power shaft 31, connected by a coupling 32 to a shaft 33 which carries, fixed thereto, a bevel drive pinion 34. This bevel drive pinion is suitably journaled in a portion of a gear casing 36 which is mounted on a larger, multi-piece gear casing 37. The pinion 34 meshes with and drives a bevel gear 38 keyed to a transverse shaft 39 journaled in the gear casing 37 and in another gear casing element 40. The shaft 39 has keyed to it a sleeve 41 on which there is integrally formed a spur drive pinion 42 and on which there is also carried a larger spur drive gear 43, non-rotatively secured in any suitable manner to the sleeve 41. The drive pinion 42 and the drive gear 43 constitute the drive elements of a low and high speed mechanism 44, and the drive pinion 42 meshes with a gear 45 journaled on a bearing sleeve 46 on a shaft 47 which is journaled, as at 49 and 50, in the gear casing elements 37 and 40. The gear 45 is freely rotatable relative to the shaft 47, but has clutch jaws 51 by means of which, as later described, it may be connected in driving relation with the shaft 47. The larger drive pinion 43 engages a gear member 53, which has clutch jaws 54 formed on it; and these clutch jaws may be engaged with the clutch jaws 51 by sliding the gear member 53 to the right in Fig. 6. When the gear member 53 occupies the position shown in Fig. 6, however, it transmits the rotation which it derives from the driving gear 43 to the shaft 47 through a spline connection 55. It will be noted, therefore, that the shaft 47 will be rotated at a relatively high speed when the gear member 53 is in the position shown in Fig. 6, and at a slower speed, through the gear 45, the clutch jaws 51 and 54, and the spline connection 55, when the clutch jaws are engaged with each other and the gear member 53 is disengaged from the driving gear 43. Any suitable means may be provided for shifting the gear member 53 from one position to the other, and I have provided a shifter fork 57 engaging trunnions 58 on a shipper member 59 fitted over an annular flange 60 formed on the gear member 53; and the fork is secured, as at 62, to a vertical shaft 63 having an operating handle 64 and journaled in a bore 65 in the gear casing portion 37.

That the spline shaft 47 may be driven at two speeds, each in the same direction, has been noted. This shaft 47 is adapted to drive in opposite directions, through drive connections which will now be explained, the tractor or crawler treads which support the apparatus.

The spline shaft 47 has slidably secured to it a driving gear 70, which may be moved, by means of a groove 71 in its hub portion 72, longitudinally of the shaft 47. A shipper yoke 73 carried by a transversely extending rod 74 has portions 73S engaging in the groove 71; and the rod 74 can be shifted longitudinally by means of a pivoted lever 75 mounted on the cover 76 of the gear casing portion 36, and having at one end thereof an operating handle 77. The gear 70, in the position shown in Fig. 6, meshes with a gear 81 mounted in bearings 82 supported by the casing element 40. The gear 81 also meshes with a gear 85 formed on a sleeve 86, which also carries a larger gear 87 of appropriate construction and size to be engaged by the gear 70 when the latter is moved to the left in Fig. 6 from the position shown, and is disengaged from the gear 81. It will thus be seen that the gear 81 is adapted to be driven directly by the gear 70 in a direction opposite to the direction of rotation of the gear 70, and, by the gear 70, through the gear 87, sleeve 86 and pinion 85, which meshes with the gear 81, in the same direction as the gear 70. The sleeve 86 is suitably journaled on a shaft 90 mounted at its opposite ends in the casing element 40 and supporting a bearing element 91 between it and the wall of the bore 92 which extends through the sleeve 86 and the gears 85 and 87.

The gear 81 has bolted to it a sleeve 94 to which there are appropriately fixed a series of inwardly projecting friction discs 95, while with these discs there are interleaved other discs 96 connected by splines 97 and notches, not shown in view of the small scale employed, with a sleeve 98, splined as at 99 to a shaft 100, journaled as at 101 in the hub of the gear 81 and at 102 in a member 103 which forms the casing of a braking mechanism generally designated 104. Radially projecting portions formed thereon connect a series of friction discs 107, as shown in Fig. 10, to the brake casing 103, while an intermediate series of discs 108 is connected by splines 109 to a sleeve 110 fixed by the splining 99 against turning relative to the shaft 100. The shaft 100 carries, at its left hand end in Fig. 6, a drive pinion 112, which meshes with a gear 113 formed on a sleeve 114, journaled on a shaft 115 supported in the wall of the casing element 40 and in a cover plate 116 associated with the housing. The sleeve 114 carries a drive pinion 117 which actuates, through a speed reduction gearing including a large gear 118 and a coaxial small pinion 119 fixed to the gear 118, and a large gear 120 keyed as at 121 to a transverse shaft 122, a tractor or crawler tread drive sprocket 123 having a sleeve portion 124 which is splined at 125 to the shaft 122 for rotation with the latter. The tractor or crawler tread drive sprocket 123 drives a flexible tractor or crawler tread 126 made up of a plurality of ground-engaging elements 127 pivotally connected at 128 and supported by rollers 129 journaled on non-rotating shafts 130 which are secured in the walls of the tractor or crawler frames 13.

So far, the drive and braking provisions for the crawler or tractor tread at the right hand side of the machine (looking forward) have been described, but it will be understood, of course, that at the left hand side of the machine there is an essentially duplicate crawler or tractor tread with corresponding braking and driving means, the parts of which are indicated, to the extent to which they are visible and have seemed to warrant marking, by primed numbers corresponding to the numbers used in the detailed explanation of the mechanism at the right hand side of the machine. The plural speed drive mechanism and the reversing mechanism at the right hand side of the machine are not duplicated at the left hand side of the machine (looking forward) but instead the hub portion 131 of the gear 81 has a splined driving connection at 132 with a transversely extending shaft 133, which extends through seals 134 and 135 respectively at the right and left hand sides of the machine frame (looking forward) and which has a splined connection corresponding to the splined connection at the right hand side of the machine with the sleeve 131' secured to the clutch housing 94'.

The sleeves 98 and 110 carry pivoted shipper elements 137 and 138 respectively, which are adapted to be moved to effect the application of pressure to the clutch and brake discs by means of reciprocable wedge elements 139 engaged and movable by a grooved collar 140. With this collar a shipper yoke 141 cooperates, the yoke 141 being carried on a rod 142 suitably guided, as at 143 and 144, in the frame or casing element 40. The rod 142 is movable by a bell crank 145 pivoted at 146 on a vertical pivot stationary with respect to the casing element 40; the arm of the bell crank coacting with the rod 142 having an adjustable connection therewith, as illustrated in Fig. 10, and the other arm of the bell crank being connected by a link 147 with an arm 148 on the outer one, 150, of a pair of coaxial shafts 149, 150, as shown in Fig. 12. The shaft 149 is journaled near its end in a bracket 151 secured to the body 12. The shipper mechanism for the clutch and brake mechanisms at the left hand side of the machine (looking forward) are similar to but reversely arranged as compared with those at the right hand side, and the corresponding but reversed bell crank associated with the mechanism at the left hand side of the machine is similarly operated through the center shaft 149 within shaft 150. The shaft 149 also has a bearing bracket 152 supported on the frame 40; and the shafts 149 and 150 have operator controllable levers 154 and 155 respectively.

It will be evident that the flexible tractor or crawler treads may be controlled independently of each other by the levers 154 and 155, the latter controlling the tread which is at the right hand side of the vehicle (looking forwardly). Either tread can be connected for drive by its associate drive clutch (94 or 94') and either may be braked by the associated disc brake mechanism (104 or 104'). Both treads can be braked simultaneously, and they may be driven together. When driven together, and with the drive clutches loaded to the point at which no slippage takes place, the treads will obviously be driven at like rates, since the transverse shaft 133 causes the drive clutch sleeves 94 and 94' to turn at equiangular rates. The sleeve 94' being driven by the sleeve 94, and the latter being driven by the gear 81, it will be evident that the treads can be driven in either direction at will—in one direction when the driving gear 70 engages with and drives the gear 81 and in the other direction when the driving gear 70 meshes with and drives the gear 87 and the latter, through the sleeve 86 and the gear 85, drives the gear 81. Noting that the drive gear 70 is supported by the splined shaft 47 and connected with the latter for rotation therewith; and, noting that the shaft 47 can be driven in like directions but at quite different speeds when the gear 53 is driven by the gear 43 and when the gear 53 is disconnected from the gear 43 and is clutched to the gear 45, which is in turn driven by the pinion 42 coaxial with the gear 43, it will be appreciated that "high" and "low" speed drives for the treads are possible.

Summarizing, under the control of the control lever 64, high or low speed drives can be initiated; and, under the control of the control lever 75, the direction of drive can be selected. Under the control of the levers 154 and 155 the tread or treads to be driven or braked can be determined and whether braking or drive shall be effected can be determined.

The gear 45 has keyed to its hub portion 166 a gear 167. Gear 167 obviously rotates whenever the gear 45 is turning, and this gear 167 meshes with and drives a gear 168 carried on a shaft 169, journaled at 170 in the gear casing 37, and at 171 in the gear casing element 40. The shaft 169 carries a sprocket 172 which drives a chain 173, which engages a sprocket 174 suitably mounted, as later described, on a shaft 175 carried near the rear end of rearward frame portion 176. Sprocket 174 normally drives shaft 175 when it is itself rotating. On the shaft 175, there are mounted drive sprockets 177 which drive a flight conveyor 178 later more fully described. The shaft 175 is provided with a splined portion 183 on which a clutch jaw carrying element 184 is slidably arranged, being normally held with its bevel edged jaw elements 185 in interlocking engagement with similarly beveled jaw elements 186 carried on the sprocket 174. A resilient, deformable, snap type spring disc 187, held in position by a screw and nut connection 188 at the end of the shaft 175, normally holds the jaws 185 and 186 in cooperating relation, but in the event that the conveyor 178 becomes stuck, as by jamming by a large piece of coal, the jaw elements 186 will so coact with the jaw elements 185 as to force the member 184 to the right in Fig. 14, against the pressure of the spring disc 187, and interrupt the drive. The action of the spring disc 187 is such that when it has been forced past a determined position it snaps in the other direction and allows the element 184, which is connected to drive the shaft 175, to remain out of contact with the clutch jaws 186. When the conveyor 178 has been freed from its obstruction, the member 184 and the disc 187 may be moved to cause the jaw elements 185 of the member 184 to re-engage with the jaw elements 186, and drive of the shaft 175 and of the flight conveyor carried thereby, may be reinitiated.

From what has already been said it will be appreciated that the elongated body 12 is supported near the rear end of the tractor mounting by the transverse support member 14, which is bolted to the top of the body 12 and bolted at its ends to the tractor frames, and that at the forward end of the body there are the laterally extending feet or foot members 15 which also rest upon the tractor frames. By means of this construction, the body 12 may be arranged in a low position, thus reducing the overall height of the machine by supporting the body mounted parts in correspondingly lower positions.

The body 12 may desirably be of welded construction, and has its interior divided into a relatively shallow lower chamber 190, and a considerably higher material conveying chamber 191, by a partition 192. The flight conveyor chain 178 is adapted to travel rearwardly over the top of the partition 192, and forwardly beneath the partition while resting on the bottom wall 194 of the body 12. The drive for the flight conveyor chain has been described hereinabove.

Figure 18:
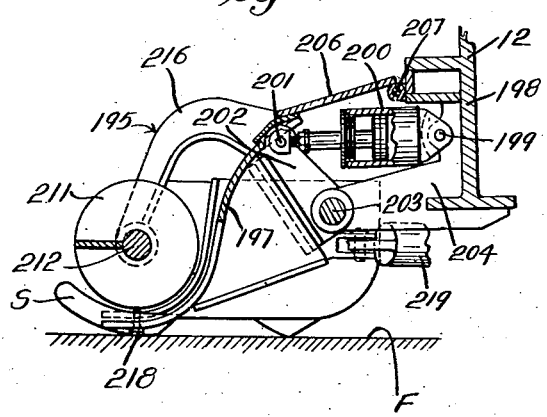
Fig. 18 is a detail vertical sectional view, with parts in full, showing the cylinder and piston mechanism for adjusting the front end of the delivery conveyor and the scrolls associated with it.
Figure 18A:
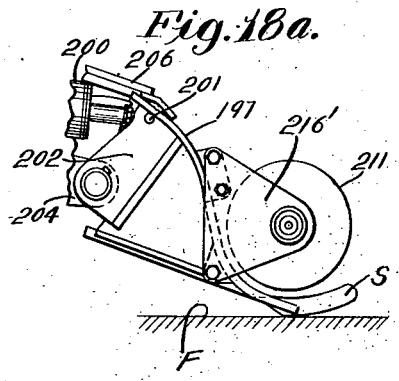
Fig. 18a is a detail elevational view on the same general plane as Fig. 18, showing a modification which may be used when front scrolls only are employed.

The front end of the main frame pivotally supports a shovel and nose piece arrangement which is of welded construction as illustrated and is generally designated 195. This includes a guide structure 196 about which the forward end of the conveyor 178 passes and which is arranged opposite the mouth of the passage 191; and at either side of the frame and guide structure 196 there are laterally extending curved plate elements 197 forming a part of the swinging structure and curved to cooperate with scroll elements shortly to be described. The front end of the frame member 12 has secured to it a transversely extending, forwardly projecting frame structure 198 which includes, as shown, a rear pivot mounting 199 for a piston and cylinder mechanism 200, the end of which not connected to the pivot mounting 199 is connected at 201 to a plate element 202 which is welded to other parts of the structure 195. The rear pivot mounting 199, the piston and cylinder mechanism 200 and the connection 201 to the plate element 202 may be duplicated at opposite sides of the main conveyor, the two cylinder and piston mechanisms then receiving fluid or being vented, as the case may be, through a common main conduit. The structure 195 is pivotable about a horizontal axis at 203, upon bearing means supported by forward projections 204 upon the transverse frame structure 198. Several—herein seven—curved shoes S underlie the forward end of and are arranged at the bottom of the structure 195 to serve as runners. "Flapper" plates 206 are hingedly connected, on the hinge line 207, to the frame 12 by means of suitable bearings. They cover the exposed spaces laterally between the sides of frame 12 and the outside lines of the machine and longitudinally to the rear of the plates 197. To prevent escape of material off of the edges of the conveyor, cooperating plates 208, 209 and 210 are provided at each side of the conveyor. Plates 208 are secured to and form a part of the swinging structure 195 and are arranged just outside the lateral edges of the conveyor and at the adjacent edges of the plates 197. To the frame structure 198 there are secured the plates 209; and the plates 210, secured to the plates 209, overlap with the rearward edges of the plates 208 which, as will be understood, swing relative to the plates 209. Helical conveyors or scrolls 211 are supported by shafts 212 which are rotatable by sprockets 213 which are engaged and driven by the roller side chains 214 of the flight conveyor 178, which may be noted to include transverse flights or bars 215 supported by suitably spaced links. The outer ends of the shafts 212 are supported in bearing supports 216 bolted to pads on the plates 197. The plates 197 are curved, as above noted, to cooperate with the scrolls or helical conveyors 211. As shown in Fig. 18a, a triangular mounting plate 216' may be substituted for the angular mounting 216 if only the scrolls mounted on the shafts 212 are to be employed. Truncated-cone shaped members D at the adjacent ends of the scrolls operate to facilitate the movement of material being forced centrally by the scrolls, onto the front end of the main conveyor. To clean up the loose material from the mine bottom between the sides of the crawlers and the ribs, extension scrolls 211E may be connected by universal joints 217 with the ends of the shafts 212 which support the scrolls 211, and plates 197E constituting, in effect, extensions of the curved plates 197, may be pivotally connected to the latter by pivot pins 218, and resilient connections 219 pivotally connected between the crawler frames and the outer ends of the extension plates 197E normally crowd the lateral cleanup devices forwardly, but allow them to yield when an obstruction is encountered.

While a delivery conveyor is not at all times essential to the apparatus described, it is a useful adjunct when loading is to be done, for example, onto a shaker or other conveyor, and also when a number of forward movements of the apparatus may be desired between lengthenings of the conveyor line, or, again, when operations in a fairly wide room may result in a positioning of the apparatus at different times in different relations laterally of the face with respect to a conveyor line; and those skilled in the art will readily visualize other circumstances under which a tail or delivery conveyor would be useful. Accordingly, I shall now describe a tail conveyor which is adapted to be used with the loading apparatus so far described.

Referring, then, to Figs. 19 to 26, both inclusive, it will be observed that a tail or delivery conveyor 221, having its rear end 222 swingable upwardly and downwardly and also laterally, is suitably supported by the rear end of the frame section 12. Suitably secured as at 223, whether by bolting or welding, or otherwise, to the bottom of the frame section 12, there is a downwardly and rearwardly projecting bracket 224 whose rearward end 225 underlies the tail or delivery conveyor at the forward end of the latter and has an upstanding pivot pin 226 which is received in a bearing bushing 227 arranged centrally of a transversely extending member 228 which is turnable about the axis of the pivot pin 226 and which, at its ends, supports bearings 229 received in upstanding plate portions 230, which are secured to the side plates 231 of the conveyor 221, and which permit upward and downward tilting of the rear end 222 of the conveyor 221 about the horizontal axis of the trunnion-providing bearings 229 (Fig. 20).

The delivery conveyor is of boxlike construction, and the side plates 231 carry spillboard portions 233 diverging laterally from each other and connected at their forward ends with an enlarged hopper portion 234 at the forward end of the delivery conveyor. This conveyor also includes an upper, generally horizontal plate 236 over which the active run 237 of the conveyor belt 238 passes; and the return run of this belt 238 moves in a space 239 within the boxlike section formed by the side walls 231, the top wall 236, and a bottom wall 240. In alinement with the member 226 there is supported another vertical bearing pin 242 (Fig. 22). This is rotatably supported in a member 243 which is carried in non-rotative relation thereto by a member 244 which is bolted, as at 245, to the top of the frame member 12. The member 243 carries an arcuately slotted plate 247 in fixed relation to it, for a purpose which will later be described. The member 242 carries at its top a ring element 248 forming a support for a single acting-cylinder element 249, in which a cylindrical piston 250 is movable, a packing 251, and a gland 252 and a gland follower 253 being provided at the forward end of the cylinder 249. Fluid may be supplied through a conduit 254 to the rear end of the cylinder 249, and, as will shortly appear, this will be effective to cause a lifting of the rearward end of the delivery conveyor. The ring element 248 has laterally extending ears 256, bored to provide cylindrical guideways 257 in which guide rods 258 are movable. These guide rods, at their forward ends, are connected as by welding at 259 to a cross member 260 which is fixed to the front end of the piston 250 and which carries, on pivot pins 261, rollers 262. The member 248 also has attached to it a transversely extending frame 264 carrying at its opposite extremities pairs of pins 265, 266 which serve to guide between them chain runs, as will shortly be described.

An upstanding suitably stiffened frame 270 is mounted on the tops of the spillboard portions of the tail conveyor and carries a motor 271 which constitutes the source of power for driving the tail conveyor. The upper part of the frame 270 has, at its opposite sides, pivotally connected to it, at 272, yieldable chain connection structures 273, these latter each including a headed rod 274, a cylindrical body 275 and a spring 276 arranged between the head of the rod 274 and the rearward head 277 of the cylindrical body 275, through which head the rod 274 extends. A connection 278 is arranged on the forward head of each cylindrical body 275 for the connection of a chain 280, which extends forwardly and over lower guide 266, then forwardly and over a roller 262, and then back to a connection pin 281 secured to one side of the frame 264 below the guide pin 266. It will be understood that there are chains at each side of this connecting mechanism.

Now, it will be evident that, if pressure is supplied through the connection 254, the piston 250 will be forced forward in the cylinder 249, and there will be an elevation of the connections 272 and a resultant higher elevation of the rear end 222 of the conveyor, whereas permitting fluid to escape from the cylinder 249 permits lowering of the delivery end of the tail conveyor. One of the arms of the frame section 264 carries a bolt and nut arrangement 283 cooperating with an arcuate groove 284 in the member 247 to lock the delivery conveyor in any desired angular relation. The delivery conveyor has been indicated to include a belt element 238. This passes about a guide roller or pulley 286 at the forward end of the delivery conveyor and around another adjustable guide roller or pulley 287 at the rear end of the delivery conveyor. These pulleys may be of like construction, if desired, and consist of hub portions having ribs 288 projecting outwardly from them and terminating in a cylindrical surface. The rear pulley is journalled as at 289 (Fig. 26) in sliding frame elements 290, slotted as at 291 so that ears 292 attached to the side frame elements of the delivery conveyor may extend through the openings. Internally threaded ears 293 are fastened to the frame sections 290, and headed screws 294 rotatable in the ears 292 threadedly engage in threaded bores 295 in the ears 293. Obviously, when the screws are rotated in a direction to draw the ears 293 toward the ears 292, the conveyor belt will be tightened.

The motor 271 has a power shaft 300 (Fig. 25) carrying a multi-groove drive pulley 301, connected as by V-belt drive 302, with a multi-groove pulley 303 mounted on a transverse shaft 304 journaled as at 305 in a housing structure 306 secured to the side frame elements of the delivery conveyor. Obviously, any other suitable form of transmission between the motor and the shaft 304 could be used. The other end of the shaft 304 carries a drive sprocket 307 connected by a sprocket chain 308 with a drive sprocket 309 mounted coaxially with and in driving relation to the forward pulley 286. The structure of, and the mode of operation of, the tail conveyor will be clear from what has been said, if it be borne in mind that, as previously stated, the forward end of the tail conveyor includes a relatively large receiving pan or hopper portion 234 to which the spillboards connect and which provides a relatively large hopper for the reception of the discharge from the flight conveyor 178. The angle in altitude of the tail conveyor can be changed by admitting fluid through the conduit 254 or permitting its escape. The lateral angle may be determined by releasing the screw and nut device 283, angling the conveyor as may be desired about the axis of the pin member 242 and the underlying alined axis of the pin 226, and then tightening the parts in desired relation by means of the bolt and nut device 283.

A cylinder and piston mechanism 200 has been described—note that there may be a pair of these—for the purpose of determining the position of the nose section of the conveyor 178. It is desirable that the nose section shall be raised during tramming, and it is also desirable that the nose section and the scrolls shall be permitted to ride in contact with the mine floor during the loading operation, and a special valve mechanism is provided in association with a conduit 311 connected with the front end of said cylinder and piston mechanism for this purpose. This valve mechanism is designated 312. This has a cylindrical bore 313 in which a piston valve 314 is reciprocable. The spools of this valve are separated by such a distance that when they are in the position shown in Fig. 27, the conduit 311 is connected with another conduit 316, which is a vent line as will later appear. Connections 317 and 318 lead from a control valve unit 319 for the cylinder 200 (unit 319 is later more fully described) and enter the opposite ends of the casing of the valve casing 312. Since either end of this valve casing may, therefore, be supplied with fluid under pressure while the other is connected to exhaust and then have the fluid which has been admitted to it trapped in it by allowing the control valve of the valve unit 319 to move to neutral or central position, as will shortly be explained, it will be clear that, when it is desired to do so, fluid may be supplied to the front end of the cylinder 200 to lift the scrolls and the front end of the conveyor 178 and maintain them in raised positions; or the front end of the cylinder 200 may simply be continuously connected to drain, with the result that the devices which it is capable of lifting may simply rest upon the mine floor.

The tail conveyor has, as above noted, the single-acting control cylinder 249, and this has its fluid supply and venting conduit 254 connected to a valve unit 320, also shortly further described.

The control of the cylinder and piston devices 200 and 249 requires a smaller number of valve units than are illustrated in application Serial No. 11,688, and I have accordingly illustrated in Fig. 27 only two control valve units, those numbered 319 and 320 and above mentioned.

A reservoir 325 serves as a source of operating fluid. A suction connection 336 leads to a pump 337 which may be driven by the motor 30 through a chain and sprocket drive connection 338, of which a portion is shown in Fig. 8, this chain and sprocket drive being driven by the same shaft 169 which drives the main conveyor. The pump 337 has a discharge line 339 which leads to a supply and relief valve box 342. The sections 319 and 320 are shown arranged between the end valve box 342 and a spaced discharge box 343, which is connected by an exhaust line 344 back to the reservoir 325. The box 342 has two chambers in it—one numbered 345 and with which the connection 339 communicates, and the other numbered 346. A differential type relief valve 347 is movable, when the pressure in the chamber 345 exceeds the desired supply pressure, against the action of a spring 348 to connect the chamber 345 with the chamber 346 and so, as will shortly appear, with the return line 344 through a discharge chamber 349. It will be observed that there is provided between the chamber 346 and the chamber 349 a continuously open passage, including an opening 356 formed in the section 342 and identical chambers 357 in the units 319 and 320, which communicate with each other and connect the opening 356 with an opening 358 in the valve box unit 343. At the other end of each of the sections 319 and 320 is another exhaust chamber 360, these connected with each other and one connected with the chamber 349, but neither communicating with the supply chamber 345.

Each of the units 319 and 320 has associated with it a multi-spool control valve element 361, each having a control lever 361' pivoted on a bracket attached to its valve box section, and each valve includes relatively long end spools 362 and 363 and relatively narrow spaced central spools 364 and 365. Spools 362 and 364 are separated by a groove 366, spools 364 and 365 are separated by a groove 367, and spools 363 and 365 are separated by a groove 368.

Devices of conventional form for returning each of the valves to its central position when it is free so to move, are shown in the form of springs 369 and spring abutments 370, of well known form. The valves in the boxes 319 and 320 are differentiated from each other by the suffixes C and T.

The sections 319 and 320 each provide a pair of spaced supply grooves 373 and 374 each of which opens through the side walls of the section by suitable passage means 375. The passages 375 at the left hand side of the valve casing 319 communicate with the openings 377 and 378 in the section 342. The two supply grooves 373 are in communication with each other and the supply grooves 374 are in communication with each other, so that fluid at whatever pressure the pump 337 may be delivering is always available in any of the grooves 373 and 374. It will be noted that wall portions 380 and 381 of the box 343 prevent communication of these supply passages with the chamber 349. Means is also provided for permitting, so long as the valve elements 361C and 361T are in their respective central positions, the free flow of fluid from chamber 345 to the chamber 349, but each valve element 361 is operative when it is moved to supply fluid to the cylinder which it controls to interrupt this free flow-through. This may be readily understood by noting that the section 342 has a passage 385 opening into a passage 386 in the valve unit 319 and that the passage 386 is connected, in the median position of the valve element 361C, by an opening 387 with a passage 388 which communicates with a passage identical with the passage 386 but in the adjacent valve unit 320. The unit 320 has a passage, corresponding to the passage 388, which opens through a passage 390 into the chamber 349. When either of the valves 361 is moved a distance sufficient to bring its spool 364 or its spool 365 into the opening 387, the free connection of pump delivery line with pump return line is interrupted, and the pressure immediately builds up to the value determined by the setting or loading of the relief valve 347.

One more set of connections associated with the several valve casings exists. Substantially midway between the exhaust chamber 357 and the supply chamber 373 there is, in each control valve unit, an annular chamber 393. Likewise, midway between the supply chamber 374 and the exhaust chamber 360 of each control valve unit there is another annular chamber 394. In the case of the valve unit 319, the annular chamber 393 is connected with the conduit 317 and the annular chamber 394 with the conduit 318. In the case of the unit 320, the annular chamber 393 is connected with conduit 254, while the annular chamber 394 is blanked off, so to speak, in any suitable manner.

The mode of operation of the system described will be readily understood. For the nose of the main conveyor and the scrolls to move along the mine floor, the position of the parts will be as shown in Fig. 27, with the forward end of the cylinder and piston device 200 connected, through the space between the spools of the piston valve 314, with the conduit 316 and the conduit 344 and the interior of the tank 325. Should it be desired to lift the nose of the conveyor and the scrolls, fluid would simple be supplied under the control the the valve 361C through the conduit 317 and shift the automatic control valve 314 to effect supply of fluid through the conduit 311 to the forward end of the cylinder and piston device 200. Raising and lowering of the tail conveyor may be accomplished under the control of the valve 361T through the supply and discharge of fluid through the conduit 254.

Further description of the mode of operation of this loading apparatus is not necessary, but it may be noted that the loading apparatus will clear the mine floor in advance of itself as it moves forward, material directly in front of the main conveyor being picked up by the forward end of the latter, the material in front of the crawlers being moved by the inner scrolls laterally and then handled by the main conveyor, and the loose material between the sides of the crawlers and the ribs will be picked up by the yieldable side scroll sections and will be moved laterally inwardly by these independently mounted side scrolls and their associated plates and then conveyed by the inner scrolls to the main conveyor. In the event that, as when working near a rib, the yieldably mounted side scroll sections strike the rib they may yield backwardly and thus not be damaged, while yet they will clear the floor close to the rib.

While there are in this application specifically described one form and a modification which the invention may assume in practice, it will be understood that this form of the same and said modification are shown for purposes of illustration and that the invention may be further modified and embodied in various other forms without departing from its spirit or the scope of the appended claims.

What I claim and desire to secure by Letters Patent is:

1. In an apparatus for handling material from a mine floor, a conveyor having an upper run for receiving material and moving it rearwardly and having at its opposite sides crawlers for supporting and advancing the same, said conveyor having a nose portion positionable at the level of the mine floor immediately in advance of said crawlers, bottom cleaning screw devices at opposite sides of said conveyor for clearing paths for said crawlers, said bottom cleaning devices also immediately in advance of said crawlers and positionable at the level of the mine floor, said bottom cleaning screw devices discharging material for loading and conveying out by said upper conveyor run, and auxiliary bottom cleaning screw devices to the outside of said first mentioned bottom cleaning devices for cleaning the bottom between said crawlers and the walls of a mine passage in which said apparatus is operating, said auxiliary bottom cleaning devices having connections with said first mentioned bottom cleaning devices and the latter having connections with said nose portion through which elevation of said nose portion effects bodily elevation of both of said bottom cleaning devices above the mine bottom.

2. In an apparatus for handling material from a mine floor, a conveyor having an upper run for receiving material and moving it rearwardly and having at its opposite sides crawlers for supporting and advancing the same, said conveyor having a nose portion positionable at the level of the mine floor immediately ahead of the forward ends of said crawlers, bottom cleaning screw devices at opposite sides of said conveyor and actuated thereby for clearing paths for said crawlers, said bottom cleaning devices also immediately ahead of the forward ends of said crawlers and disposable at the level of the mine floor, said bottom cleaning screw devices discharging material for loading and conveying out by said upper conveyor run, and auxiliary bottom cleaning screw devices to the outside of said first mentioned bottom cleaning devices and driven by the latter for cleaning the bottom between said crawlers and the walls of a mine passage in which said apparatus is operating, said auxiliary bottom cleaning devices having connections with said first mentioned bottom cleaning devices and the latter having connections with said nose portion through which elevation of said nose portion effects bodily elevation of both of said bottom cleaning devices above the mine bottom, each of said bottom cleaning devices having a concave material guiding backup plate and said first mentioned connections including a vertical pivotal connection between said backup plates.

3. A bottom cleaning device for clearing a path for the supporting and propulsion mechanism of a mining apparatus and for cleaning the mine bottom between said apparatus and a mine rib, including, in combination, pairs of helical conveyors rotated in a direction to move material towards their mutually adjacent ends and having material guide plates associated with them and having forwardly extending lower sides, pivotal connections between said guide plates of each pair at the lower sides thereof, a universal drive connection between said helical conveyors of each pair, means constantly acting on one of said guide plates of each pair tending to aline it with the other, and drive means for the helical conveyor with which said other guide plate is associated.

4. In an apparatus for cleaning up the bottom of a mine, a support movable over the mine bottom and having propulsion and supporting devices adjacent its opposite sides, means for picking up material in advance of said supporting and propulsion devices and delivering it toward the center of said apparatus, means disposed centrally of said apparatus and comprising upper and lower deck plates for conveying along said upper deck plate picked up material rearwardly of said support, and means pivotally connected to said material pickup means and having associated therewith means for resiliently pressing it in a forward direction from a rearwardly inclined position towards a position in alinement with said means for picking up material, for cleaning up material outside the lateral limits of said propulsion and supporting devices and delivering it to said material pickup means, said means pivotally connected to said material pickup means including a helical scroll having a concave backup plate conforming to the periphery of said scroll and said means for resiliently pressing acting on said backup plate.

5. In a material loading apparatus, the combination comprising an endless conveyor, a frame for guiding said conveyor extending for a substantial distance in close proximity to a mine floor and having upper and lower deck plates having a forward pivoted portion mounted to swing in vertical planes relative to the remainder thereof to a position to receive material from the mine floor onto its upper deck plate, said conveyor having its forward receiving portion guided on said pivoted frame portion and said frame portion being swingable to locate said conveyor receiving portion near the floor level, a power device connected to said swingable frame portion for elevating said front conveyor portion, and means including oppositely acting gathering devices extending obliquely rearwardly in opposite directions from the opposite sides of said pivoted frame portion and carried by and raised and lowered with the latter for gathering loose material on the floor and for moving such material oppositely inwardly and forwardly toward said forward receiving portion of said conveyor for movement rearwardly along the upper deck plate of the latter.

6. In a material loading apparatus, the combination comprising an endless conveyor, a frame including upper and lower deck plates for guiding said conveyor extending for a substantial distance in close proximity to a mine floor and having a forward pivoted portion mounted to swing in vertical planes relative to the remainder thereof to a position to receive material onto said upper deck plate from the mine floor, said conveyor having its forward receiving portion guided on said pivoted frame portion and said frame portion being swingable to locate said conveyor receiving portion near the floor level, a power device connected to said swingable frame portion for elevating said front conveyor portion, and means including oppositely acting gathering devices extending obliquely rearwardly in opposite directions from the opposite sides of said pivoted frame portion and carried by and raised and lowered with the latter for gathering loose material on the floor and for moving such material oppositely inwardly toward said forward receiving portion of said conveyor for reception on the upper deck plate, said gathering devices including concave backup plates having pivotal mountings including vertical pivots.

7. In a material loading apparatus, the combination comprising an endless conveyor having top and bottom runs, a frame for guiding said conveyor extending for a substantial distance in close proximity to a mine floor and having a forward pivoted portion mounted to swing in vertical planes relative to the remainder thereof to a position to receive material from the mine floor, said conveyor having its forward receiving portion guided on said pivoted frame portion and said frame portion being swingable to locate said conveyor receiving portion near the floor level, a power device connected to said swingable frame portion for elevating said front conveyor portion, and means including oppositely acting gathering devices extending obliquely rearwardly in opposite directions from the opposite sides of said pivoted frame portion and carried by and raised and lowered with the latter for gathering loose material on the floor and for moving such material oppositely inwardly toward said forward receiving portion of said conveyor for movement rearwardly by the top run thereof, said gathering devices including concave backup plates having pivotal mountings including vertical pivots and said gathering devices having means for advancing them angularly to bring them more nearly into alinement.

8. A loading apparatus as set forth in claim 5, wherein said pivoted frame portion has runner-like floor engaging shoes underlying said gathering devices and adapted to ride over the mine floor when said power device is inactive.

References Cited in the file of this patent

UNITED STATES PATENTS

| | | |
|---|---|---|
| 1,143,897 | Flexner et al. | June 22, 1915 |
| 1,508,716 | Ochs | Sept. 16, 1924 |
| 1,569,531 | Barry | Jan. 12, 1926 |
| 1,673,457 | Jensen | June 12, 1928 |
| 2,002,952 | Levin | May 28, 1935 |
| 2,078,863 | Lundbye | Apr. 27, 1937 |
| 2,199,723 | Garland et al. | May 7, 1940 |
| 2,206,828 | Sloane | July 2, 1940 |
| 2,229,648 | Garlinghouse | Jan. 28, 1941 |
| 2,315,091 | Fees | Mar. 30, 1943 |
| 2,410,012 | Churchman | Oct. 29, 1946 |
| 2,425,695 | Fees | Aug. 12, 1947 |